(12) United States Patent  (10) Patent No.: US 9,086,544 B2
Lin  (45) Date of Patent: Jul. 21, 2015

(54) OPTICAL CONNECTOR HAVING SLOT FOR LOCATING OPTICAL FIBER AND METHOD FOR ASSEMBLING OPTICAL CONNECTOR

(71) Applicant: Hon Hai Precision Industry Co., Ltd., New Taipei (TW)

(72) Inventor: I-Thun Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 186 days.

(21) Appl. No.: 13/749,702

(22) Filed: Jan. 25, 2013

(65) Prior Publication Data

US 2014/0079355 A1   Mar. 20, 2014

(30) Foreign Application Priority Data

Sep. 14, 2012  (TW) .............................. 101133807 A

(51) Int. Cl.
*G02B 6/36* (2006.01)
*G02B 6/32* (2006.01)

(52) U.S. Cl.
CPC *G02B 6/36* (2013.01); *G02B 6/322* (2013.01); *G02B 6/3636* (2013.01); *Y10T 29/49826* (2015.01)

(58) Field of Classification Search
USPC ......................................................... 385/79
See application file for complete search history.

(56) References Cited

U.S. PATENT DOCUMENTS

| 4,534,616 | A | * | 8/1985 | Bowen et al. .................. 385/79 |
| 4,718,744 | A | * | 1/1988 | Manning ........................ 385/79 |
| 6,062,740 | A | * | 5/2000 | Ohtsuka et al. ................ 385/81 |
| 6,302,595 | B1 | * | 10/2001 | Vilgiate et al. ................. 385/88 |
| 6,779,929 | B1 | * | 8/2004 | Savage, Jr. ..................... 385/92 |
| 7,503,703 | B1 | * | 3/2009 | Thorson ......................... 385/71 |
| 7,539,383 | B2 | * | 5/2009 | Sendai et al. ................. 385/128 |
| 7,542,644 | B2 | * | 6/2009 | Tanaka et al. ................ 385/114 |
| 8,057,106 | B1 | * | 11/2011 | Zhovnirovsky et al. ....... 385/74 |
| 2009/0214165 | A1 | * | 8/2009 | Shimotsu et al. .............. 385/79 |
| 2011/0280522 | A1 | * | 11/2011 | Tamura et al. ................. 385/88 |
| 2011/0286698 | A1 | * | 11/2011 | Greenberg et al. ............ 385/33 |

* cited by examiner

*Primary Examiner* — Sung Pak
(74) *Attorney, Agent, or Firm* — Novak Druce Connolly Bove + Quigg LLP

(57) ABSTRACT

An optical connector includes a base including a main body and a number of optical elements, and a number of optical fibers. The main body includes a first surface, a third surface perpendicularly connecting the first surface, and a fourth surface facing away the third surface, and defines a number of slots, which is perpendicular to the third surface, in the in the first surface. The slots run through the third surface. Each of the slots includes a regular wide first section and a second section connecting the first section and running through the third surface. Each of the second section tapers from the third surface to the first section. The optical elements are formed on the fourth surface and aligned with the slots. The optical fibers are slid and fitted in the first sections, guided by the second sections.

7 Claims, 1 Drawing Sheet

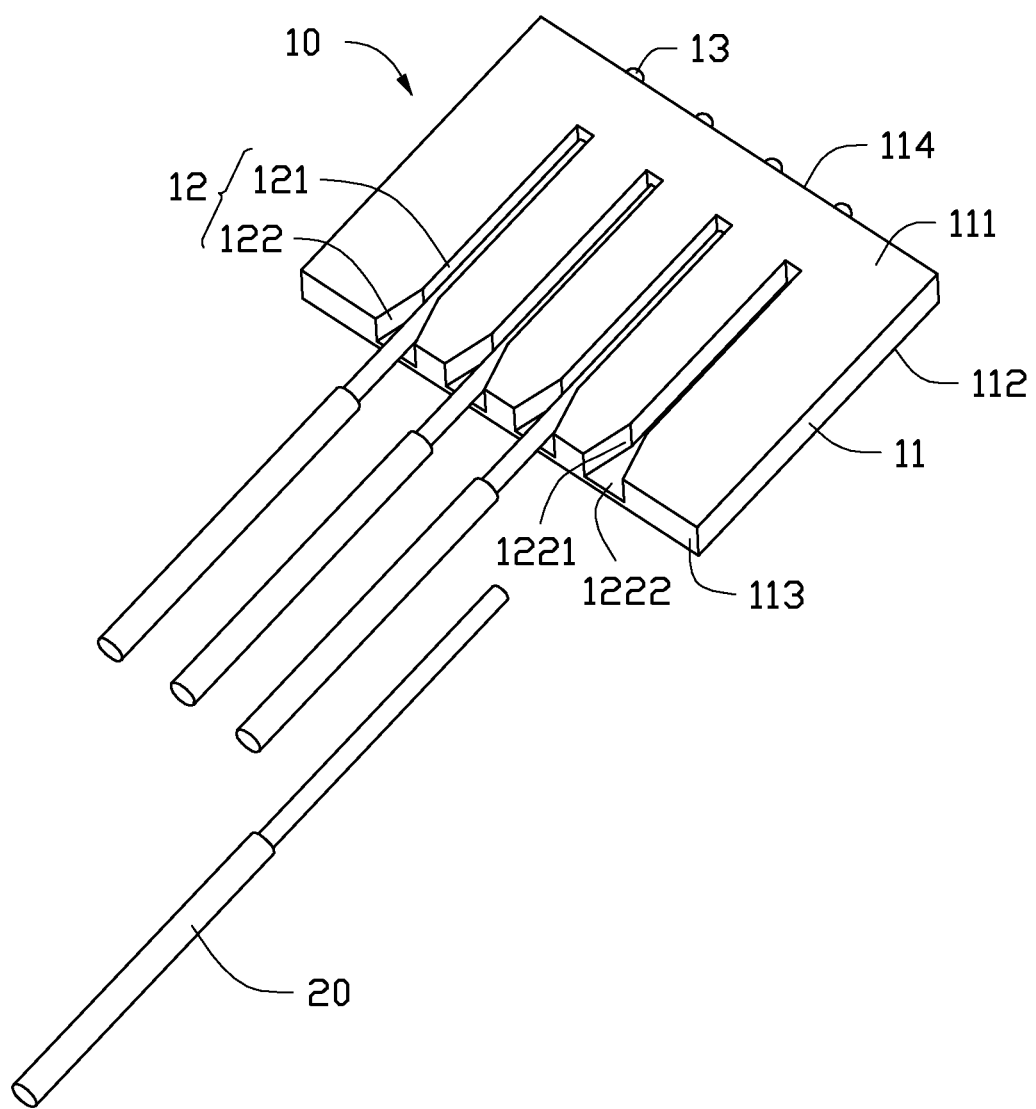

OPTICAL CONNECTOR HAVING SLOT FOR LOCATING OPTICAL FIBER AND METHOD FOR ASSEMBLING OPTICAL CONNECTOR

BACKGROUND

1. Technical Field

The present disclosure relates to optical connectors and methods for assembling optical connectors.

2. Description of Related Art

A typical optical connector includes a base, such as a silicon bench, and a number of optical fibers assembled in the base. The base includes a number of optical elements such as lenses, laser diodes, and photodiodes, corresponding to the optical fibers. To reduce insertion loss and thus ensure transmission quality, it is required that the optical fibers be optically aligned with the optical elements. However, in practice, alignments between the optical fibers and the respective optical elements are often less than satisfactory.

Therefore, it is desirable to provide an optical connector which can overcome the above-mentioned problems, and a method for assembling such optical connector.

BRIEF DESCRIPTION OF THE DRAWING

Many aspects of the present disclosure can be better understood with reference to the following drawing. The components in the drawing are not necessarily drawn to scale, the emphasis instead being placed upon clearly illustrating the principles of the present disclosure.

The drawing is an isometric schematic view of an optical connector, according to an embodiment of the present disclosure.

DETAILED DESCRIPTION

Embodiments of the present disclosure will be described with reference to the drawing.

The drawing shows an optical connector in accordance with an embodiment of the present disclosure. The optical connector includes a base 10 and a number of optical fibers 20.

The base 10, such as a transparent silicon optical bench, includes a main body 11 and a number of optical elements 13.

The main body 11 is substantially a rectangular block in shape, and has a first surface 111 (i.e., an upper surface as shown in the drawing), a second surface 112 facing away the first surface 111 (i.e., a lower surface as shown in the drawing), a third surface 113 perpendicularly connecting the first surface 111 to the second surface 112 (i.e., a front surface as shown in the drawing), and a fourth surface 114 facing away the third surface 113 (i.e., a back surface as shown in the drawing).

The main body 11 defines a number of slots 12 in the first surface 111. Each of the slots 12 runs along a direction that is substantially perpendicular to the third surface 113, through the third surface 113 but terminating before reaching the fourth surface 114. Each of the slots 12 defines a square or rectangular cross section taken parallel with the third surface 113. Each slot 12 includes an elongated first section 121 generally adjacent to the fourth surface 114, and a second section 122 extending from the first section 121 and running through the third surface 113. The first section 121 has a regular width (i.e., as measured along a direction parallel with the third surface 113). In the present embodiment, the first section 121 has a square cross section taken parallel with the third surface 113. The second section 122 tapers from the third surface 113 (i.e., from a wide end 1222 of the second section 122) to the first section 121 (i.e., to a narrow end 1221 of the second section 122). That is, a width of the second section 122 becomes gradually smaller from the wide end 1122 to the narrow end 1121. A width of the narrow end 1121 is equal to the width of the first section 121. In the present embodiment, any cross section of the second section 122 taken parallel with the third surface 113 is rectangular, except for a cross section of the narrow end 1121.

In the illustrated embodiment, all the slots 12 are substantially identical, and can be equidistantly arranged. The slots 12 can be manufactured using semiconductor machining technologies, such as photolithography, to ensure preciseness.

The optical elements 13, such as lenses, are formed on the fourth surface 114, and are optically aligned with the respective slots 12.

Each of the optical fibers 20 includes a substantially circular front end. The front end has a diameter that is substantially equal to or slightly larger than the width of the first section 121 of the corresponding slot 12, and has a length greater than a length of the corresponding slot 12.

In assembly, the front end of each optical fiber 20 is inserted into the corresponding slot 12 via an opening of the slot 12 at the third surface 113. Being guided by the second section 122, the front end of the optical fiber 20 can be easily slid into the first section 121. Then, being guided by the first section 121, the front end of the optical fiber 20 is interferingly slid to an end of the first section 121 far from the third surface 113. As such, each optical fiber 20 is optically aligned with the corresponding optical element 13.

It will be understood that the above particular embodiments are shown and described by way of illustration only. The principles and the features of the present disclosure may be employed in various and numerous embodiments thereof without departing from the scope of the disclosure. The above-described embodiments illustrate the scope of the disclosure but do not restrict the scope of the disclosure.

What is claimed is:

1. An optical connector, comprising:
   a base comprising a main body and a plurality of optical elements;
   the main body comprising a first surface, a second surface facing away from the first surface, a third surface perpendicularly connecting the first surface and the second surface, and a fourth surface facing away from the third surface;
   the main body defining a plurality of slots in the first surface, each of the slots running along a direction that is substantially perpendicular to the third surface, through the third surface but terminating before reaching the fourth surface, each of the slots comprising a first section generally adjacent to the fourth surface and a second section extending from the first section and running through the third surface, the first section having a regular width, the second section tapering from the third surface to the first section; and
   the optical elements being formed on the fourth surface and aligned with the slots, respectively; and
   a plurality of optical fibers, each optical fiber guidingly received in the first section of a corresponding slot and interferentially received in the first section of the corresponding slot.

2. The optical connector of claim 1, wherein the main body is made of silicon.

3. The optical connector of claim 1, wherein each of the slots defines a square or rectangular cross-section taken parallel with the third surface.

4. The optical connector of claim 1, wherein the slots are equidistantly arranged.

5. The optical connector of claim 1, wherein the optical elements are lenses.

6. A method for assembling an optical connector, the method comprising:

provesidng a base, the base comprising a main body and a plurality of optical elements, the main body comprising a first surface, a second surface facing away from the first surface, a third surface perpendicularly connecting the first surface and the second surface, and a fourth surface facing away from the third surface, the main body defining a plurality of slots in the first surface, each of the slots running along a direction that is substantially perpendicular to the third surface, through the third surface but terminating before reaching the fourth surface, each of the slots comprising a first section generally adjacent to the fourth surface and a second section extending from the first section and running through the third surface, the first section having a regular width, the second section tapering from the third surface to the first section, and the optical elements being formed on the fourth surface and aligned with the slots, respectively; and providing a plurality of optical fibers;

inserting a front end of each of the optical fibers into a corresponding one of the slots, the front end being guided by the second section to slide to the first section; and inserting the front end of the optical fiber into the first section and to an end of the first section far from the third surface.

7. The method of claim 6, wherein a diameter of the front end of each of the optical fibers is substantially equal to or slightly larger than a width of the first section of the corresponding slot, and the front end of the optical fiber is interferingly slid into the first section and to the end of the first section far from the third surface.

* * * * *